United States Patent [19]

Belonenko et al.

[11] Patent Number: 5,450,899
[45] Date of Patent: Sep. 19, 1995

[54] METHOD OF SUPPLYING GAS TO GAS CONSUMERS

[75] Inventors: Vladimir N. Belonenko, Moskovskaya; Mikhail G. Gabrielyants, Moscow, both of Russian Federation

[73] Assignee: Aktsionernoe Obschestvo Zakrytogo Tipa "Biotekhinvest", Moscow, Russian Federation

[21] Appl. No.: 108,699

[22] PCT Filed: Jan. 31, 1992

[86] PCT No.: PCT/RU92/00025
§ 371 Date: Dec. 16, 1993
§ 102(e) Date: Dec. 16, 1993

[87] PCT Pub. No.: WO92/15511
PCT Pub. Date: Sep. 17, 1992

[30] Foreign Application Priority Data

Mar. 6, 1991 [RU] Russian Federation ............ 4913858

[51] Int. Cl.⁶ ................. E21B 43/12; E21B 43/24; E21B 43/25
[52] U.S. Cl. .................... 166/248; 166/249; 166/250; 166/272; 166/299; 166/370; 405/56; 405/57
[58] Field of Search ............ 166/248, 249, 265, 302, 166/369, 370, 250, 272, 299; 299/14; 405/53, 56, 57

[56] References Cited

U.S. PATENT DOCUMENTS

| | | | |
|---|---|---|---|
| 3,952,800 | 4/1976 | Bodine | 166/249 |
| 4,040,487 | 8/1977 | Cook, Jr. et al. | |
| 4,049,053 | 9/1977 | Fisher et al. | 166/249 |
| 4,060,128 | 11/1977 | Wallace | 166/249 |
| 4,084,638 | 4/1978 | Whiting | 166/248 |
| 4,114,689 | 9/1978 | Dismukes | 166/249 |
| 4,116,276 | 9/1978 | Cook, Jr. et al. | |
| 4,149,596 | 4/1979 | Richardson et al. | 166/267 |
| 4,149,598 | 4/1979 | Christian | |
| 4,164,978 | 8/1979 | Scott | 166/249 |
| 4,199,028 | 4/1980 | Caughey | 166/370 |
| 4,261,419 | 4/1981 | Probstein et al. | 405/53 X |
| 4,378,047 | 3/1983 | Elliott et al. | 166/370 X |
| 4,417,621 | 11/1983 | Medlin et al. | 166/249 |
| 4,444,259 | 4/1984 | Schwall | 166/265 |
| 4,638,863 | 1/1987 | Wilson | 166/248 |
| 4,701,072 | 10/1987 | Berezoutzky | 405/53 |
| 4,705,108 | 11/1987 | Little et al. | 166/248 |
| 5,101,899 | 4/1992 | Hoskins et al. | 166/248 |

FOREIGN PATENT DOCUMENTS

| | | |
|---|---|---|
| 2168942 | 9/1973 | France . |
| 442287 | 9/1974 | U.S.S.R. . |
| 859606 | 9/1981 | U.S.S.R. . |
| 1032171A | 7/1983 | U.S.S.R. . |

OTHER PUBLICATIONS

F. A. Trebin et al. "Production of Natural Gas".

*Primary Examiner*—George A. Suchfield
*Attorney, Agent, or Firm*—Keck, Mahin & Cate

[57] ABSTRACT

A method for supplying gas to gas consumers, which method resides in forming a storage reservoir above a gas-saturated water-bearing horizon under development, filling the storage reservoir thus-formed with gas by periodically subjecting the horizon under development to extraneous effects, followed by delivering the gas to gas consumers. Extraneous effects can be exerted by generating elastic vibrations, providing a pressure difference, raising the temperature, applying electromagnetic field oscillations, or combining these factors. If the method of the invention is used in seismically active areas or in regions exposed to effects of elastic vibrations, its efficiency is considerably increased.

22 Claims, 3 Drawing Sheets

METHOD OF SUPPLYING GAS TO GAS CONSUMERS

FIELD OF THE INVENTION

The present invention relates to methods for supplyign gas to gas consumers, and, more specifically, to a method for supplying gas consumers with gas by forming a storage reservoir, preferably in immediate vicinity to the gas consumer, filling it up with gas extracted from gas-saturated water-bearing horizons, followed by reclaiming the gas at will.

The invention may be advantageously used for creating a gas pool ready for use, and for supplying therefrom gas to gas consumers in a simple and dependable manner.

DESCRIPTION OF THE PRIOR ART

It is common knowledge that gas is produced from gas, gas-condensate, and oil-gas-condensate deposits at areas of their naturally occurring formation which takes long (in geologic terms) periods of time, whereas gas consumers (such as industrial enterprises, municipal services, etc.) are normally supplied with gas using the following procedure: gas production from gas deposits—in-situ gas preparation—gas transportation to gas-consuming areas in which storage reservoirs are formed and filled with gas to become a gas source from which gas users can be provided with gas at will.

To solve the above-formulated problem, in the prior art frequent use was (and is) made of providing an underground reservoir for storing gas in the vicinity of areas where it is consumed. It is exactly this technique that is described, e.g. in a book by Trebin F. A., Makogon Yu. F. and Basniev K. S. NATURAL GAS PRODUCTION, Nedra Publishers, Moscow, 1976, p.368. It is a technique known in the prior art to use underground trap reservoirs developed as a result of naturally occurring geologic processes in prospecting for naturally formed gas deposits and for assessment of gas reserves according to seam pressure drops. For instance, USSR Inventor's Certificate No.1,032,171 (published on Jul. 30, 1983) proposes a method whereby a trap disposed above a gas deposit is used for assessment of gas reserves in accordance with seam pressure drops in the trap in the course of passage of a gas flow through the trap, but without ever reclaiming the gas passed therethrough.

USSR Inventor's Certificate No.442,287 (published on Nov. 21, 1974) provides a method whereby free gas is liberated from gas-hydrate deposits by subjecting them to the effect of vibrations generated by an electromagnetic emitter or by a magnetostrictive drill inserted into a gas well.

Equally known in the prior art (Ref. USSR Inventor's Certificate No.859,606; published on Oct. 5, 1981) is a method for operating an oil well, whereby a source of acoustic vibrations is immersed into the oil well for the purpose of liberating gas from the liquid column in the oil well, whereafter the oil well is operated in the gas lift operational mode.

Also known in the prior art is a method for gas production by causing the gas to be transported by the flow of the underground stratum (seam) liquid to the day surface, followed by separating the gas from the liquid (Reference Book on Oil Production, NEDRA Publishers, Moscow, 1974, pp.511-512).

U.S. Pat. No. 4,040,487 (published on Aug. 9, 1974) and U.S. Pat. No. 4,116,276 (publ. on Sep. 26, 1978) are directed to a method for increasing the natural gas production from a water-bearing horizon containing water and gas by pumping water therefrom.

Also known in the prior art are methods for recovering hydrocarbons from their naturally occurring deposits using vibratory or acoustic effects (Ref. U.S. Pat. No. 3,952,800 issued on Apr. 27, 1976; U.S. Pat. No. 4,060,128 issued on Nov. 29, 1977; 4,114,689 issued on Sep. 19, 1978; U.S. Pat. No. 4,417,621 issued on Nov. 29, 1983), accompanied with thermal effects (Ref., e.g. U.S. Pat. No. 4,049,053 issued on Sep. 20, 1977), or using electromagnetic field effects (Ref. U.S. Pat. No. 4,084,638 issued on Apr. 18, 1978; U.S. Pat. No. 4,164,978 issued on Aug. 21, 1979; U.S. Pat. No. 4,638,863 issued on Jul. 25, 1986; and U.S. Pat. No. 4,705,108 issued on Nov. 10, 1987).

However, none of the above-cited patents makes provision for gas liberation from gas-saturated water-bearing seams, for the formation of storage reservoirs, for development of new gas fields, etc.

The main disadvantages inherent in the prior-art methods reside in the following:

in using storage reservoirs for underground storing of gas in the vicinity of gas consumers, such reservoirs are filled with the earlier extracted gas which had been transported preliminarily from gas-producing regions situated, as a rule, at great distances from the gas consumers. This system of gas supply to gas users involves construction of trunk pipelines, pump stations, etc., which involves large financial, material, power, etc. expenses;

extraction of stratal gas-saturated water to the day surface, followed by gas separation is, for practical purposes, an unprofitable business, since it involves moving large quantities of liquid and is encumbered with many other troubles brought about by a high mineralization of stratal waters;

gas extraction from a water-bearing horizon by reducing its pressure owing to constant pumping-out of water for a long period of time (at least for a year) suffers from the same disadvantages as stated above (water must be pumped out of each well in quantities of from 15 to 25×10 barrels per day), slow recovery of gas, and incomplete retrieval of gas from a horizon;

The remaining citations characteristic of the prior-art level are associated with natural hydrocarbon deposits already under development.

Meanwhile, hydrocarbon deposits under development are being gradually exhausted, while newly discovered deposits are located, as a rule, at considerable distances from industrial areas and from other regions where natural gas is consumed, and gas transfer to them constitutes a labour-intensive and cost-intensive problem. As to the formation of new deposits due to processes naturally occurring in the Earth's depths, it takes geological periods to form them.

In this connection, the problem of industrial recovery of gas from other gas sources becomes more and more acute, in particular, the problem of gas production from gas-containing water-bearing horizons, althrough, until the advent of the present invention, direct gas recovery from such horizons was regarded as impossible or, at least, industrially unrewarding. The point is that such horizons occur rather frequently in nature and often may be found in the vicinity of gas-consuming areas.

Not infrequently such horizons merge together to form vast subterranean fields occupying fairly considerable surface areas reaching several thousands of square kilometers and, possibly, even more. Their use for gas recovery, particularly in those areas where natural gas and oil-gas-condensate deposits are absent, would make it possible to considerably increase the tonnages of gas produced and to facilitate solution of the problem of supplying consumers with gas.

Until the advent of the present invention, the commercial-scale gas production from water-bearing horizons has not been paid due attention because of excessive labour input and poor efficiency of the hitherto known methods.

The present invention is aimed at solving this problem.

SUMMARY OF THE INVENTION

It is the object of the present invention to develop a method for supplying consumers with gas from gas-saturated water-bearing horizons, for increasing the volumes of gas extracted from gas reserves, and for reducing the expenses associated with shipments of gas. It is another object of this invention to use natural or artificial sources of elastic vibrations occurring in an area with a view to bringing down power consumption involved in the gas production from such horizons.

The above-formulated objects are accomplished by the formation of a storage reservoir above a gas-saturated water-bearing horizon and to the filling it with gas by subjecting the gas-saturated water-bearing horizon to the periodic action of various effects. It has been established that it is exactly the combined use of these factors that makes it possible to efficiently and reliably extract gas from gas-saturated water-bearing horizons and to store it in the reservoir thus-formed for stable gas supply to gas users.

Effects periodically exerted onto a gas-saturated water-bearing horizon may be achieved by generating elastic vibrations in the horizon, e.g. elastic vibrations induced by explosions and/or with the aid of a source of acoustic, vibratory or seismic waves.

Such effects may also be achieved by raising the temperature by, e.g. injecting hot steam into a water-bearing horizon (particularly through an injection well) or at the expense of the heat generated by a working electric heater sunk into a horizon, e.g. through a gas extraction well. It is preferable to use thermal effects when gas is found in the form of gas hydrates.

Effects on a gas-saturated water-bearing horizon may be also achieved with the help of an electromagnetic field, e.g. by electric discharges emitted by a spark-gap device or by electrodes immersed into a water-bearing stratum and supplied with constant voltage or, e.g. with frequency-modulated voltage.

Elastic vibrations and electric current influence not only the processes taking place in fluids, but also exert their effect upon the collecting properties of a geological seam (stratum). For instance, as a result of subjecting a water/gas-saturated horizon to treatment with electric pulses there are generated thermal, electromagnetic, and physico-chemical effects (e.g. electric current pulses provoke phenomena of electrolysis, electroosmosis, etc.), as well as elastic disturbances, primarily shock waves conducive to cracking of a collector seam, to acceleration of the flow of liberating gas towards gas wells, and to more complete gas recovery from seams (strata).

By subjecting gas-saturated water-bearing horizons to the intermittent effect of elastic vibrations it is possible to significantly speed up the gas liberation processes, and to boost up and intensify the gas flow towards a storage reservoir. With the help of vibrations it is also possible to control gas flow conditions. Using low-frequency vibrations within the range of from 0.1 to 60 Hz, it is possible with the aid of a single source of seismic vibrations located on the surface to exert effect simultaneously on several gas-saturated water-bearing horizons occupying considerable surface areas and lying at significant depths. Use of such vibrations also ensures the fullest possible gas yield.

It is equally possible to achieve periodic de-gassing effect on a gas-saturated water-bearing horizon by providing a pressure difference, for instance, by organizing partial discharge of water from the water-bearing horizon.

It is also possible to exert periodically effect on a gas-saturated water-bearing horizon by making simultaneous use of all the above-mentioned factors taken in various combinations and using various sources of, such effects depending on the specific operational conditions. In doing so, the mechanism and the extent of the effect exerted onto an object by such combined factors are determined not by a mere sum total of the mechanisms of each factor, but rather by qualitatively and quantitatively new effects produced by such combinations. The efficiency of the method in accordance with the present invention is improved by using combined effects. Thus, for instance, if the effect of elastic vibrations is combined with the effect of a reduced pressure, the degassing effect becomes substantially more pronounced and manifests itself much more quickly, than in the event of using individually each of the above-mentioned factors. Apart from the above-enumerated factors, use may be made of any other factors known in the art and conducive to gas liberation from gas-saturated water-bearing horizons.

The periodicity of effects is dictated by the totality of specific parameters, namely: parameters describing the current condition of a gas-saturated water-bearing horizon (including the pressure, temperature, specific volume), its composition, physical and physico-chemical properties (relaxation properties included) of fluids and formations, their alterations under the effect of various factors applied, collecting and other properties of rocks, resonant characteristics of strata (seams), degree and filling rate of a storage reservoir, gas take-off for users' needs, and other factors.

As a gas-saturated water-bearing horizon is subjected to the effect of the above-described factors, gas liberation starts therein, the gas being liberated in diverse forms: in dissolved state, in free state, as gas bubbles, as gas hydrates, etc. However, gas liberation from such horizons takes palce non-uniformly, which fact is associated with their geologic structure and gas saturation degree. Moreover, the non-uniformity of gas liberation cannot be eliminated by controlling the periodicity of de-gassing effects. It is this non-uniformity that makes it impossible to use the gas being liberated for immediate supply of gas users and even for most modest economically effective gas transportation because of abrupt gas pressure drops and raises, and of sharp changes in gas flow rates, whereby the combined use of the above-mentioned factors is made necessary.

In accordance with the present invention, apart from the periodic degassing effects on a gas-saturated water-bearing horizon, use is made, in association therewith, of the expedient of forming at least one storage reservoir above this horizon. The term "storage reservoir" is used here to denote a certain volume capable to receive the liberated gas, e.g. subterranean voids and cavities, and to denote any space volume possessing a greater porosity and gas permeability than those of a geologic cover which surrounds a gas-saturated water-bearing horizon.

The term "formation" depending on specific geologic conditions, may denote most diverse operations. This may be a discovered structure, in which—after drilling and sealing the drilled boreholes—a reservoir is created, e.g. by blasting, by thawing down permafrost rocks, by washing out caverns in salt deposits, clays, etc., by using additional reinforcement of walls and, in particular, vault by any conventional methods. There may be formed several storage reservoirs disposed above different gas-saturated water-bearing horizons. Moreover, these storage reservoirs may be brought in hydrodynamic communication with each other.

In the process of periodically acting upon a gas-saturated water-bearing horizon and of gas liberation therefrom, a storage reservoir thus-formed is gradually filled up. Nor does the present method rule out the possibility for directing the gas liberated from a water-bearing horizon to enrich (replenish) above-lying hydrocarbon-bearing strata.

As a matter of fact, there takes place the formation of a new gas deposit or a gas pool constituted this time by a gas-filled and replenished storage reservoir.

On this occasion, the non-uniformity of gas liberation from the original gas-saturated water-bearing horizon becomes immaterial, as it is also immaterial in the geologic processes of the formation of gas deposits, whereas the gas pool thus-formed may be directly used as a sufficiently stable source of gas supply.

The considerable extent of gas-saturated water-bearing horizons which, owing to the present invention, potentially become usable for industrial gas production makes it possible, with a certain degree of freedom, to select specific areas for the formation of a storage reservoir above such horizons and, accoridngly, to select areas for exerting periodic de-gassing effects on these horizons. It is but natural that the choice of an area in the vicinity of a potential gas user may be regarded as one of most likely alternative choices, since it affords savings on gas transporation.

The very possibility for making a choice also makes it possible to form a storage reservoir over a gas-saturated water-bearing horizon at locations of natural or artificial sources of elastic vibrations. More specifically, it may be the choice of a seismically active area or a region situated in the vicinity of functioning hydroelectric power stations, railways, military test fields, quarries in which blasts take place, industrial enterprises, etc. On all such occasions, within the area in which gas is liberated to fill up a storage reservoir, an underlying gas-saturated water-bearing horizon is subjected to the action of elastic vibrations generated by the above-mentioned sources, thereby diminishing the need for the above-described artificial effects and, consequently, reducing power consumption for gas production.

DESCRIPTION OF THE PREFERRED EMBODIMENTS

Figure 1:
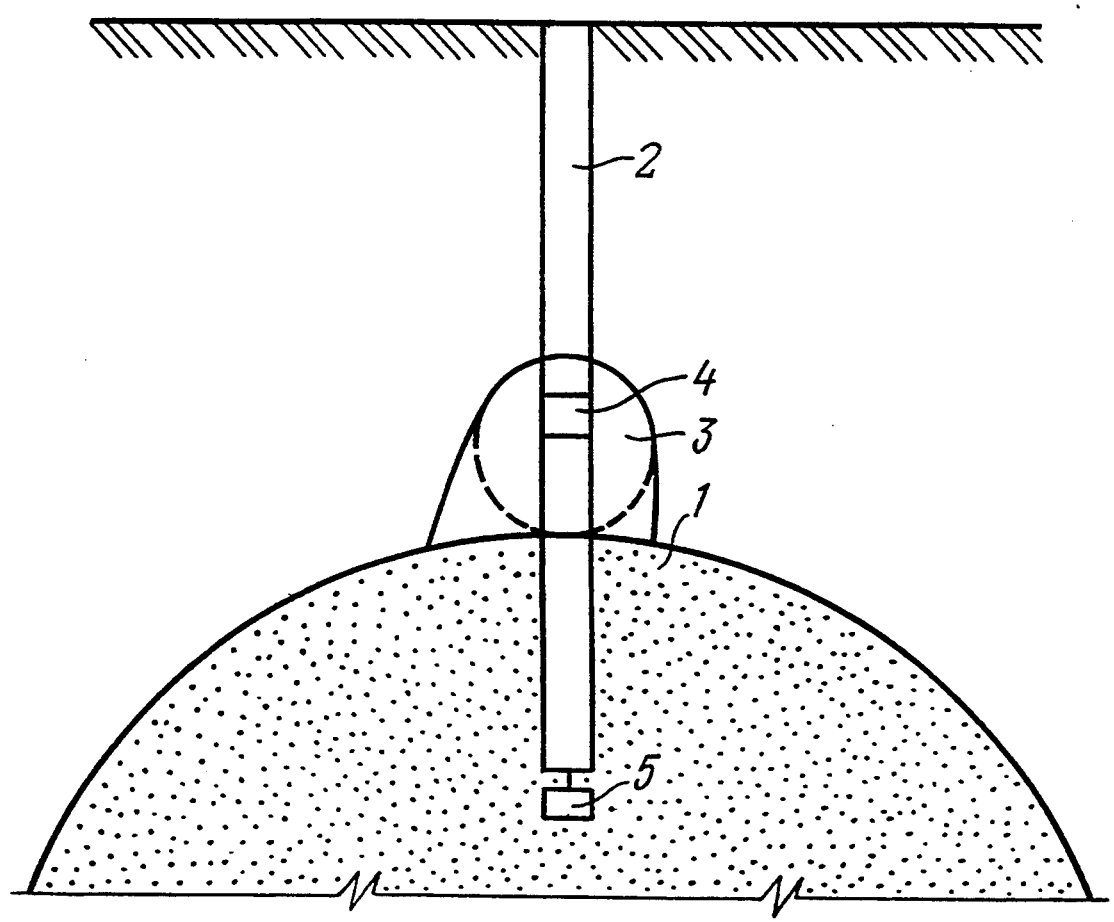
FIG. 1 schematically represents one of the embodiments of the process in accordance with the present invention, wherein a local source sunk into a horizon through a gas well exerts a de-gassing effect on a gas-saturated water-bearing horizon.

At least one well (2) (FIG. 1) is sunk over a gas-saturated water-bearing horizon (1) in an area which is convenient for operation or selected for some other considerations. To be able to receive gas being liberated, works are undertaken to form an artificial cavity above the horizon, i.e. a storage reservoir (3). At the same time, means are provided for subsequent gas take-off from the storage reservoir by forming a perforated portion (4) of the gas well (2).

Figure 2:
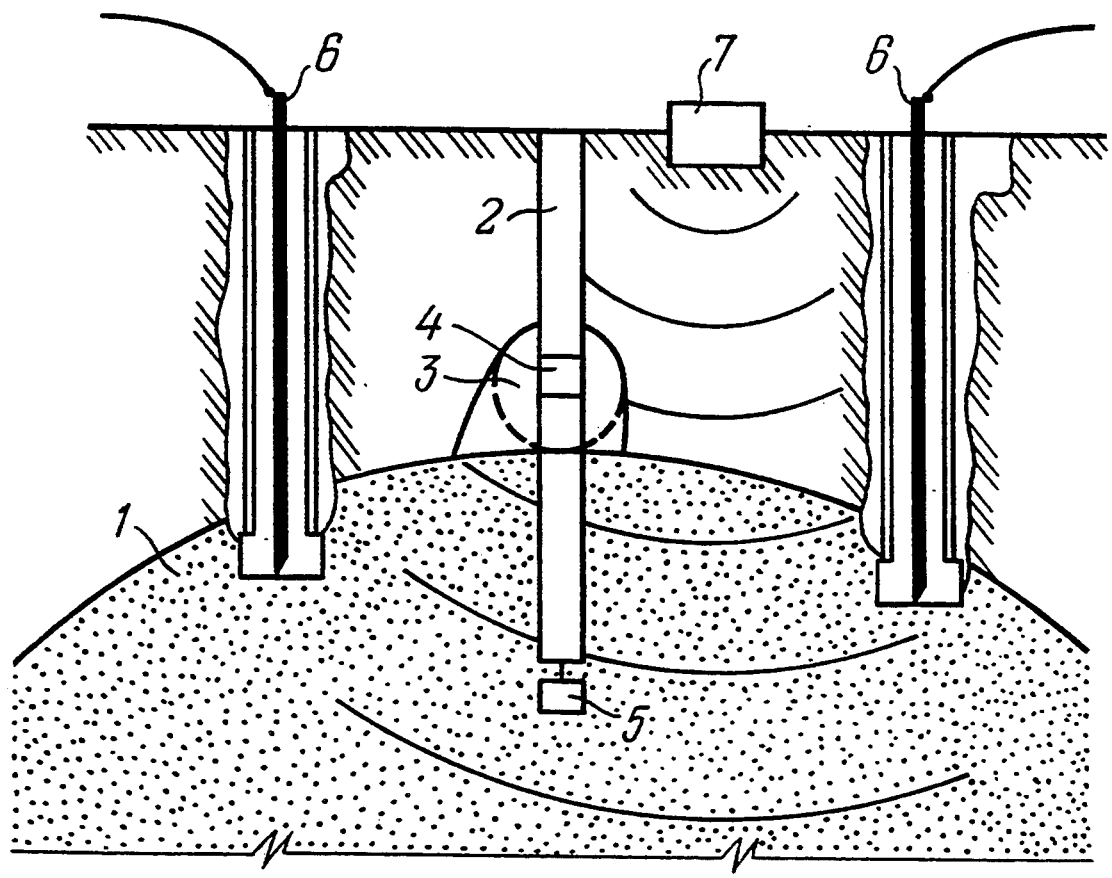
FIG. 2 represents another embodiment of the method of the invention, wherein a gas-saturated water-bearing horizon is subjected to the combined action of different sources exerting a de-gassing effect.

Thereupon, the gas-saturated water-bearing horizon is subjected to extraneous effects. In accordance with one of the embodiments of the present invention, a gas-saturated water-bearing horizon is subjected to the effect of electric discharges produced by a spark gap shown schematically as a source (5) of local degassing effects. An explosive charge may also constitute a source of local degassing effects. In accordance with another embodiment of the present invention, a horizon is subjected to the action of an electromagnetic field generated by electrodes (6) sunk into specially drilled auxiliary boreholes shown in FIG. 2. Extraneous effects may be also exerted with the help of a source (7) of elastic vibrations situated on the day surface (FIG. 2). In all of these embodiments, the efficiency of extraneous effects is enhanced by providing a pressure difference, for instance, by partial take-off of water through the gas well (2), thereby reducing the pressure in the water-bearing horizon.

As stated above, extraneous effects may be combined, as shown in FIG. 2.

Figure 3:
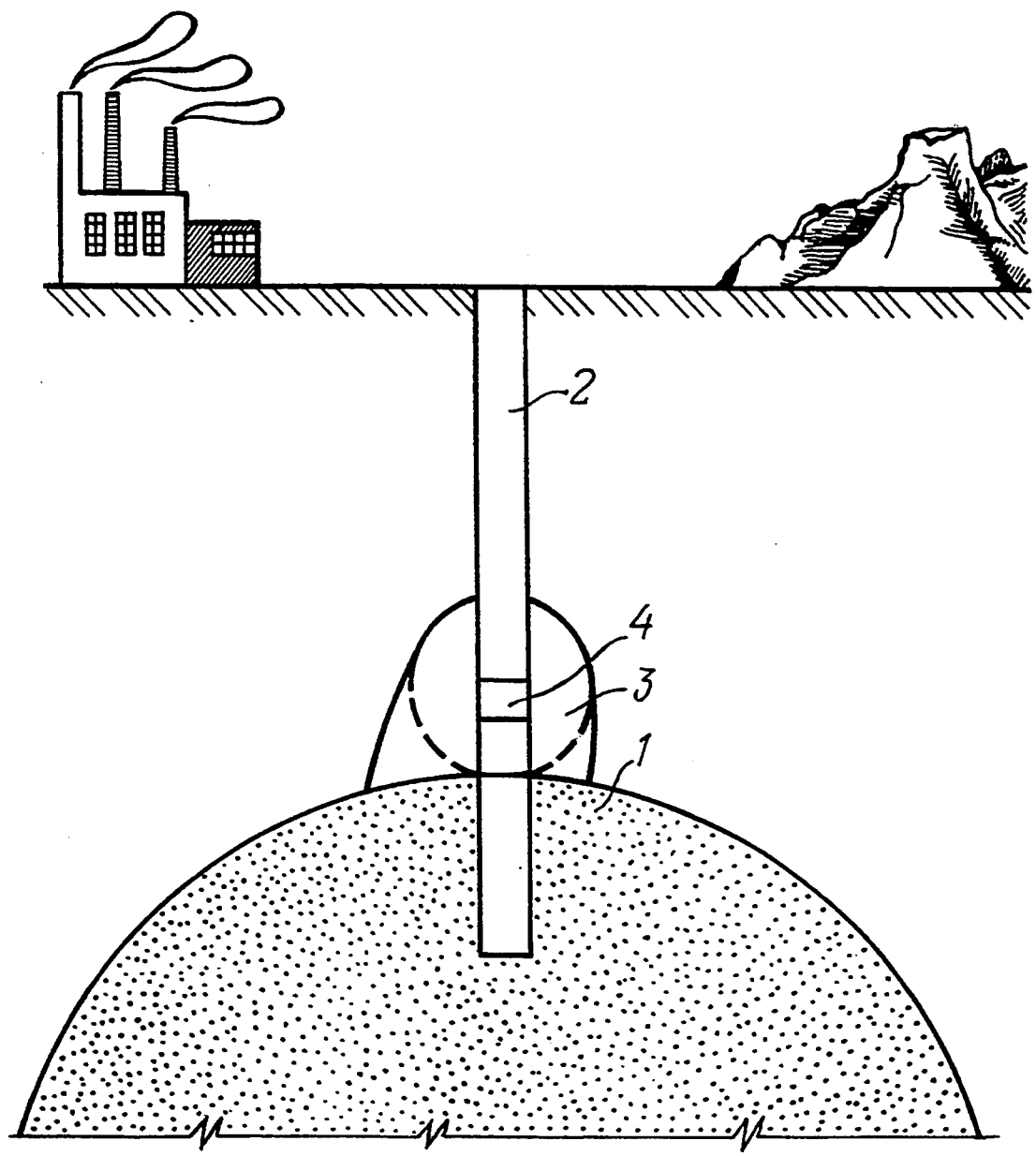
FIG. 3 illustrates yet another embodiment of the method of the invention, wherein a storage reservoir over a gas-saturated water-bearing horizon is formed in the vicinity of a source of natural or artificial vibrations.

Moreover, when forming a storage reservoir in the vicinity of natural or artificial sources of elastic vibrations, as schematically shown in FIG. 3, it becomes possible to significantly lower the need for exerting additional special-purpose degassing effects, since seismic elastic waves, by acting upon a gas-saturated water-bearing horizon, promote and considerably intensify the gas liberation process.

In all of the above-described alternative embodiments for exerting extraneous degassing effects, the gas contained in a gas-saturated water-bearing horizon starts liberating itself. Since the specific gravity of gas is lower than that of water, gas ascends, accumulates within the storage reservoir, and may be extracted therefrom through the perforated portion of the gas well.

To carry out the method in accordance with the present invention, a gas well(2) 1,200 m deep is sunk to reach a gas-saturated water-bearing horizon characterized in the following parameters:

| | |
|---|---|
| Occurrence depth | 1,000–1,500 m |
| Water-bearing pool capacity | 500 m |
| Specific volume of | 1.5–2 cub.m/cub.m |

-continued

| dissolved gas Composition of dissolved gas, including: | |
|---|---|
| $CH_4$ | 95–98% |
| $C_2H_6$—$C_5H_{12}$ | 0.5–0.3% |
| Stratal (seam) pressure | 10–15 MPa |
| Stratal temperature | 20° C. |
| Water density | 1.011 |

A storage reservoir (3) is formed by the per se known methods at the boundary between clay and sandy strata (fractures needs sealing, and this was done by grouting). A vibrations source (S) was sunk with the aid of a cable-rope through the gas well into the water-bearing horizon (1). Next, the horizon was subjected to the action of vibratory/undulatory effects using the procedure shown in FIG. 1. In the course of passage of elastic vibrations (and afterwards) through the water-bearing horizon, the gas dissolved therein starts liberating. Owing to its smaller specific gravity as compared to water, the gas ascends, accumulates in the storage reservoir to be later lifted to the day surface through the perforated portion of the gas well (4), the gas take-off conditions through the well being controllable.

Let us now examine an embodiment of the method of the invention in a seismically active area illustrated in FIG. 3, in which a gas-saturated water-bearing horizon occurring at the level of the Jurassic formation is characterized in the following parameters: water containing calcium chloride with a total mineralization of from 91 to 147 g/liter, water contians elevated iodine concnetrations (1–12 mg/l) and bromine concentrations (294–426 mg/l). Stratal water features a high degree of gas saturation (2,581–3,172 n.cm.$^3$/liter). Water-dissolved gases are predominantly methanic, and their concentraiton reaches 83–95%. The heavy hydrocarbon concentration does not exceed 5%. The gases also contain nitrogen (10%) and acid components (up to 0.5%), total pressure of dissolved gases reaching 21–51 MPa.

To carry out this particular embodiment of the method of the present invention, a borehole about 3,000 m deep is drilled. A storage reservoir is formed as described above to accumulate therein the gas liberated as a result of seismic effects. Upon expiration of a period of settling and establishing a gas/water interface, it is possible to proceed to gas take-off. The gas take-off rate from the storage reservoir depends upon the advance of the gas/water contact front (GWC) and is determined by the GWC position. The gas take-off is effected from the head portion of the storage reservoir, whereas its tail portion is used for the GWC position control by the geophysical methods. If no seismic phenomena are felt for long periods of time, recourse is made to some of the above-described methods to exert additional degassing effects.

Hence, the method in accordance with the present invention makes it possible to solve simultaneously the problems of gas recovery, gas collection and gas storing, and all this in the immediate vicinity to gas consumers.

The method in accordance with the present invention offers the following advantages: to bring into industrial turn-over such gas volumes as had been regarded hitherto as unusable and irretrievable; to form gas pools, including gas pools located close to gas consumers; to solve in the optimum manner the gas storing problem; to combine the problems of gas consumers and those of a gas production field into an integral whole to form a common automatic control system to carry out more effectively control of gas production and supply processes; to reduce the number of the servicing personnel; to curtail material, financial, power and other expenses, including minimizing the distances over which gas (and equipment) must be transported, due to dispensing with the need for construction of trunk pipelines, pump stations, gas storage facilities, etc. The method of the present invention offers an additional advantage of providing greater safety for the environment, since it renders unnecessary long-distance gas transportation. The method of the present invention may offer yet other advantages stemming out of the above Specification.

What is claimed is:

1. A process for producing gas from a gas-saturated water-bearing horizon comprising:
   drilling a well in a region of said gas-saturated water-bearing horizon,
   forming an artificial storage reservoir above said gas-saturated water-bearing horizon communicating with said well,
   communicating the artificial storage reservoir with said gas-saturated water-bearing horizon,
   periodically applying a degasifying action to said gas-saturated water-bearing horizon,
   periodically filling said artificial storage reservoir with gas liberated from said gas-saturated water-bearing horizon due to said periodical degasifying action.

2. A process for producing gas from a gas-saturated water-bearing horizon,
   drilling a group of wells in a region of said gas-saturated water-bearing horizon,
   using at least one well of said group of wells for forming at least one artificial storage reservoir above said gas-saturated water-bearing horizon, wherein said at least one artificial storage reservoir communicates with said at least one well,
   communicating the at least one artificial storage reservoir with said gas saturated water-bearing horizon,
   periodically applying a degasifying action to said gas-saturated water-bearing horizon,
   periodically filling the at least one artificial storage reservoir with gas liberated from said gas-saturated water-bearing horizon due to said periodic degasifying action,
   periodically recovering gas from said at least one artificial storage reservoir through said at least one well from said group of wells.

3. A process as claimed in claim 2, wherein forming said at least one artificial storage reservoir includes increasing the porosity and gas-permeability of rock above said gas-saturated water-bearing horizon in the vicinity of at least one well of said group of wells by means of an explosion.

4. A process as claimed in claim 2, wherein forming said at least one artificial storage reservoir includes creating a plurality of cavities in a geologic formation above said gas-saturated water-bearing horizon by washing out caverns in said geologic formation.

5. A process as claimed in claim 2, wherein forming said at least one artificial storage reservoir includes creating a plurality of cavities in a geologic permafrost formation above said gas-saturated water-bearing horizon by thawing out sections of said geologic formation.

6. A process as claimed in claim 4, wherein forming said artificial storage reservoir includes packing walls and roof of said artificial storage reservoir.

7. A process as claimed in claim 2, wherein a further artificial storage reservoir is formed above said gas-saturated water-bearing horizon and communication is effected between said artificial storage reservoirs.

8. A process as claimed in claim 2, wherein said periodical degasifying action is effected by acting on said gas-saturated water-bearing horizon with elastic vibrations to initiate the liberation of gas from said gas-saturated water-bearing horizon in said at least one artificial storage reservoir.

9. A process as claimed in claim 8, wherein the frequency of said elastic waves is within the range of from 0.1 Hz to 60 Hz.

10. A process as claimed in claim 2, wherein said periodical degasifying action is effected by acting on said gas-saturated water-bearing horizon with an electromagnetic field to initiate the liberation of gas from said gas-saturated water-bearing horizon in said at least one artificial storage reservoir.

11. A process as claimed in claim 10, wherein at least two electrodes are used, each of said electrodes is positioned in a corresponding well of said group of wells to produce an electromagnetic field, and the produced electromagnetic field is applied to said gas-saturated water-bearing horizon.

12. A process as claimed in claim 2, wherein said periodical degasifying action is effected by simultaneously acting on the gas-saturated water-bearing horizon with elastic vibrations and an electromagnetic field to initiate the liberation of gas from said gas-saturated water-bearing horizon in said at least one artificial storage reservoir.

13. A process as claimed in claim 2, including heating a section of said gas-saturated water-bearing horizon by injecting aqueous steam into said water-bearing horizon through one well of said group of wells.

14. A process as claimed in claim 2, including creating a pressure difference between said water-bearing horizon and at least one artificial storage reservoir by producing liquid and/or gas from said artificial storage reservoir.

15. A process as claimed in claim 2, including determining the position of the gas-water interface in said artificial storage reservoir during the step of filling said artificial storage reservoir with gas.

16. A process for producing gas from a gas-saturated water-bearing horizon comprising the following steps:
drilling a group of wells in the region of said gas-saturated water-bearing horizon,
using at least one well of said group of wells to form at least one artificial storage reservoir above said gas-saturated water-bearing horizon by increasing the porosity and gas-permeability of the rock above said gas-saturated water-bearing horizon in the vicinity of at lest one well of said group of wells,
communicating said at least one artificial storage reservoir with said gas-saturated water-bearing horizon,
periodically applying degasifying action to said gas-saturated water-bearing horizon by applying elastic vibrations having a frequency of from 0.1 Hz to 60 Hz to said water-bearing horizon to initiate liberation of gas from said gas-saturated water-bearing horizon in said at least one artificial storage reservoir,
periodically filling the formed at least one artificial storage reservoir with gas liberated from said gas-saturated water-bearing horizon due to the effect of said periodical degasifying action,
determining the position of the gas-water interface in said artificial storage reservoir while it is being filled with gas, and
periodically recovering gas from said at least one artificial storage reservoir through another at least one well of said group of wells when the gas-water interface reaches a predetermined position.

17. A process as claimed in claim 16, including creating a pressure difference between said water-bearing horizon and at least one artificial storage reservoir by producing liquid and/or gas from said storage reservoir.

18. A process as claimed in claim 16, wherein said forming at least one artificial storage reservoir includes increasing the porosity and gas-permeability of the rock above said gas-saturated water-bearing horizon in the vicinity of at least one well of said group of wells by means of an explosion.

19. A process as claimed in claim 16, wherein said forming at least one artificial storage reservoir includes creating a plurality of cavities in a geologic formation above said gas-saturating water-bearing horizon by means of washing out caverns in said geologic formation.

20. A process as claimed in claim 16, wherein said forming at least one artificial storage reservoir includes creating a plurality of cavities in a geologic permafrost formation above said gas-saturated water-bearing horizon by means of thawing out sections of said geologic formation.

21. A process as claimed in claim 16, wherein hydrodynamic communication is effected between said artificial storage reservoirs.

22. A process as claimed in claim 16, including simultaneously acting locally on said gas-saturated water-bearing horizon by means of a first source of elastic vibrations positioned inside the horizon and acting seismically on said horizon by means of a second source of elastic vibrations positioned on the surface of the earth.

* * * * *